(12) United States Patent
Arlt et al.

(10) Patent No.: US 10,858,190 B2
(45) Date of Patent: *Dec. 8, 2020

(54) BELT TRACKING ASSEMBLY AND METHODS FOR THE SAME

(71) Applicant: UNITED STATES POSTAL SERVICE, Washington, DC (US)

(72) Inventors: Hans Arlt, Vienna, VA (US); Christopher R. Simpson, Olney, MD (US)

(73) Assignee: UNITED STATES POSTAL SERVICE, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/749,666

(22) Filed: Jan. 22, 2020

(65) Prior Publication Data

US 2020/0262651 A1 Aug. 20, 2020

Related U.S. Application Data

(63) Continuation of application No. 16/280,688, filed on Feb. 20, 2019, now Pat. No. 10,556,746.

(51) Int. Cl.
*B65G 15/64* (2006.01)
*B65G 23/06* (2006.01)
*B65G 39/16* (2006.01)

(52) U.S. Cl.
CPC .............. *B65G 15/64* (2013.01); *B65G 23/06* (2013.01); *B65G 39/16* (2013.01)

(58) Field of Classification Search
CPC ......... B65G 15/64; B65G 23/06; B65G 39/16

USPC .................................................. 198/806–807
See application file for complete search history.

(56) References Cited

U.S. PATENT DOCUMENTS

| | | | |
|---|---|---|---|
| 2,225,276 A | 12/1940 | Parker | |
| 2,815,851 A | 12/1957 | Yoshimura | |
| 4,084,683 A | 4/1978 | Moss | |
| 4,913,328 A | 4/1990 | Schulz | |
| 6,273,243 B1 | 8/2001 | Loose et al. | |
| 6,405,854 B1 | 6/2002 | Cumberlege | |
| 9,145,262 B2 | 9/2015 | Eagleson et al. | |
| 10,392,191 B1 | 8/2019 | King | |
| 10,556,746 B1 * | 2/2020 | Arlt ........................ | B65G 23/06 |
| 2003/0136646 A1 | 7/2003 | Powell | |
| 2018/0335106 A1 | 11/2018 | Takarabe | |

* cited by examiner

*Primary Examiner* — Mark A Deuble
(74) *Attorney, Agent, or Firm* — MH2 Technology Law Group, LLP

(57) ABSTRACT

A pulley assembly for an automative machine and methods for the same are disclosed. The pulley assembly may include a monolithic body, an actuation assembly, and a pulley. The body may define a recess extending from a first end surface toward a second end surface thereof. The recess may separate an upper portion from a lower portion of the body. The body may define a bore extending through the upper and lower portions of the body. The bore may be threaded along a length thereof. The actuation assembly may include a mechanical biasing element having a threaded portion. The mechanical biasing element may be disposed in the bore such that the threaded portion thereof is threadably coupled with the threaded portion of the bore. The pulley may be rotatably coupled with the upper portion of the body such that the pully moves when the upper portion is actuated.

20 Claims, 5 Drawing Sheets

BELT TRACKING ASSEMBLY AND METHODS FOR THE SAME

CROSS-REFERENCE TO RELATED APPLICATIONS

This application is a continuation of U.S. patent application Ser. No. 16/280,688, which was filed on Feb. 20, 2019, the contents of which is hereby incorporated by reference in its entirety into the present application to the extent that it is not inconsistent with the present application.

BACKGROUND

Transport belts, also known as conveyor belts, are often utilized in automation to grip and carry items between and through machines. The transport belts are often driven by a motorized pulley, and the paths of the transport belts are often determined by the placement of idler or non-driven pulleys. A side view of a conventional non-driven pulley assembly 100 is illustrated in FIG. 1. The assembly 100 may include a pulley 102 rotatably disposed on a shaft 104 that is coupled with a deck or platform 106 of a machine, such as a conveyor belt machine, via a mechanical fastener 108. As illustrated in FIG. 1, the pulley 102 may be operably coupled with a conveyor belt or transport belt 110, and configured to at least partially maintain and determine a path of the transport belt 110.

Conventional transport belts 110 may be relatively long in comparison to their widths, and may often require multiple non-driven pulley assemblies 100 to maintain the path thereof. As such, maintaining the alignment or centering of the transport belt 110 in relation to each of the non-driven pulley assemblies 100 is necessary to facilitate the movement of the transport belt 110. Particularly, it is desirable to place or maintain the centerline of the transport belt 110 along or close to the centerline of the pulley 102. In a conventional non-driven pulley assembly 100, the centerline of the transport belt 110 is adjusted relative to the centerline of the pulley 102 by an operator (not shown) changing or adjusting an angle ($\theta_1$) of the pulley 102 relative to the deck 106 by trial and error. Specifically, the angle ($\theta_1$) of the pulley 102 relative to the deck 106 is adjusted by bending the shaft 104, rotating the already bent shaft 104, and/or utilizing angled spacers (not shown) to either increase or decrease the angle ($\theta_1$). When the angle ($\theta_1$) is decreased relative to the deck 106 (e.g., from 90 degrees to 89.7 degrees, etc.), a highpoint of the pulley 102 moves away from the deck 106, and when the angle ($\theta_1$) is increased (e.g., from 90 degrees to 90.2 degrees, etc.), the highpoint of the pulley 102 moves toward the deck 106. The bent-shaft and angled-spacer approaches to adjusting the angle ($\theta_1$) of the pulley 102 relative to the deck 106 are difficult, time consuming, and can weaken the shaft 104. Further, adjusting the angle ($\theta_1$) of the pulley 102 relative to the deck 106 while the machine is in motion or operation is typically not possible (e.g., to bend the shaft 104 while the pulley 102 is in motion) or is very dangerous to the operation (e.g., to insert angling spacers next to parts that are in motion).

What is desirable, then, are improved pulley assemblies and methods for adjusting the pulley to center the belt on the pulley.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a pulley assembly for positioning a belt of a machine. The pulley assembly may include a monolithic body, an actuation assembly operably coupled with the monolithic body, and a pulley rotatably coupled with the monolithic body. The monolithic body may include a first end surface and a second end surface. The monolithic body may define a recess extending from the first end surface toward the second end surface. The recess may at least partially separate an upper portion of the monolithic body from a lower portion of the monolithic body. The monolithic body may further define a bore extending through the upper and lower portions of the monolithic body. A portion of the bore may be threaded along a length thereof. The actuation assembly may include a mechanical biasing element having a threaded portion. The mechanical biasing element may be disposed in the bore such that the threaded portion of the mechanical biasing element is threadably coupled with the threaded portion of the bore. The pulley may be rotatably coupled with the upper portion of the monolithic body such that the pully moves when the upper portion of the monolithic body is actuated.

In at least one implementation, the actuation assembly may be disposed proximal to the first end surface of the monolithic body.

In at least one implementation, the mechanical biasing element may be configured to apply a biasing force to the upper and lower portions of the monolithic body to actuate the upper and lower portions of the monolithic body toward or away from one another.

In at least one implementation, the monolithic body may define a counterbore coaxial with the bore and extending through the lower portion of the monolithic body from a lower surface of the monolithic body to a shoulder in the lower portion of the monolithic body.

In at least one implementation, the mechanical biasing element may include a head. The mechanical biasing element may be disposed in the bore and the counterbore such that the threaded portion thereof is threadably coupled with the upper portion of the monolithic body and the head is disposed in the counterbore.

In at least one implementation, the head of the mechanical biasing element may be disposed directly adjacent to the shoulder in the lower portion of the monolithic body.

In at least one implementation, the actuation assembly may further include one or more washers interposed between the head of the mechanical biasing element and the shoulder defined in the lower portion of the monolithic body. In at least one implementation, the one or more washers may include a spherical washer set.

In at least one implementation, the monolithic body may define a counterbore coaxial with the bore. The counterbore may extend through the upper portion of the monolithic body from an upper surface thereof to a shoulder in the upper portion of the monolithic body. In at least one implementation, the mechanical biasing element may further include a head, and the mechanical biasing element may be disposed in the bore and the counterbore such that the threaded portion is threadably coupled with the lower portion of the monolithic body and the head is disposed in the counterbore. In one example, the head of the mechanical biasing element may be disposed directly adjacent to the shoulder in the upper portion of the monolithic body. In another example, the actuation assembly may further include one or more washers interposed between the head of the mechanical biasing element and the shoulder defined in the upper portion of the monolithic body. In one example, the one or more washers may include a spherical washer set.

In at least one implementation, the monolithic body may be directly coupled with a deck of the machine.

In another implementation, the pully assembly may further include a spacer interposed between the monolithic body and a deck of the machine. The spacer may be configured to position the monolithic body a specific distance from the deck. The spacer may define a hole extending at least partially therethrough. The pulley assembly may include a pin extending from a lower surface of the monolithic body, and the pin may be disposed in the hole of the spacer.

The foregoing and/or other aspects and utilities embodied in the present disclosure may be achieved by providing a pulley assembly for a machine including a deck. The pulley assembly may include a monolithic body, a mounting stud extending from and coupled with the monolithic body, a pully rotatably coupled with the mounting stud, and an actuation assembly operably coupled with the monolithic body. The monolithic body may be coupled with the deck and may include a first end surface and a second end surface. The monolithic body may define a recess extending from the first end surface toward the second end surface. The recess may at least partially separate an upper portion of the monolithic body from a lower portion of the monolithic body. The monolithic body may further define a bore extending through the upper and lower portions of the monolithic body. A portion of the bore may be threaded along a length thereof. The mounting stud may extend from and be coupled with the upper portion of the monolithic body. The actuation assembly may include a mechanical biasing element including a threaded portion and a head. The mechanical biasing element may be disposed in the bore such that the threaded portion is threadably coupled with the threaded portion of the bore and the head is disposed adjacent a shoulder defined in the upper or lower portions of the monolithic body.

In at least one implementation, the mechanical biasing element may be configured to apply a biasing force to the upper and lower portions of the monolithic body to actuate the upper and lower portions of the monolithic body toward or away from one another to thereby increase or decrease an angle of the pulley relative to the deck, respectively.

In at least one implementation, the shoulder may be defined in the lower portion of the monolithic body, the monolithic body may further define a counterbore coaxial with the bore and extending from a lower surface of the monolithic body to the shoulder in the lower portion of the monolithic body, and the mechanical fastener may be disposed in the bore and the counterbore such that the threaded portion thereof is threadably coupled with the upper portion of the monolithic body and the head is disposed in the counterbore.

The foregoing and/or other aspects and utilities embodied in the present disclosure may be achieved by providing a method for adjusting a pully assembly of a machine that includes a conveyor belt. The pulley assembly may include a monolithic body, an actuation assembly operably coupled with the monolithic body, and a pulley rotatably coupled with the monolithic body. The monolithic body may include a first end surface and a second end surface. The monolithic body may define a recess extending from the first end surface toward the second end surface. The recess may at least partially separate an upper portion of the monolithic body from a lower portion of the monolithic body. The monolithic body may further define a bore extending through the upper and lower portions of the monolithic body. A portion of the bore may be threaded along a length thereof. The actuation assembly may include a mechanical biasing element having a threaded portion. The mechanical biasing element may be disposed in the bore such that the threaded portion of the mechanical biasing element is threadably coupled with the threaded portion of the bore. The pulley may be rotatably coupled with the upper portion of the monolithic body such that the pully moves when the upper portion of the monolithic body is actuated. The method may include rotating the mechanical biasing element of the actuation assembly to apply a biasing force to the upper and lower portions of the monolithic body. The biasing force may move the upper and lower portions of the monolithic body toward or away from one another to thereby increase or decrease an angle of the pulley relative to the machine. The method may also include ceasing the rotating when the pully reaches a desired angle relative to the machine.

In at least one implementation, the mechanical biasing element may be a mechanical fastener that extends at least partially through the upper portion and the lower portion of the monolithic body, and rotating the mechanical biasing element may include rotating the mechanical fastener such that the threads apply the biasing force.

In at least one implementation, the portion of the bore extending through the upper portion of the monolithic body is threaded, the monolithic body may further define a counterbore coaxial with the bore and extending from a lower surface of the monolithic body to a shoulder in the lower portion of the monolithic body, and the mechanical fastener may be disposed in the bore and the counterbore such that the threaded portion thereof is threadably coupled with the upper portion of the monolithic body and the head is disposed in the counterbore.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

Figure 1:
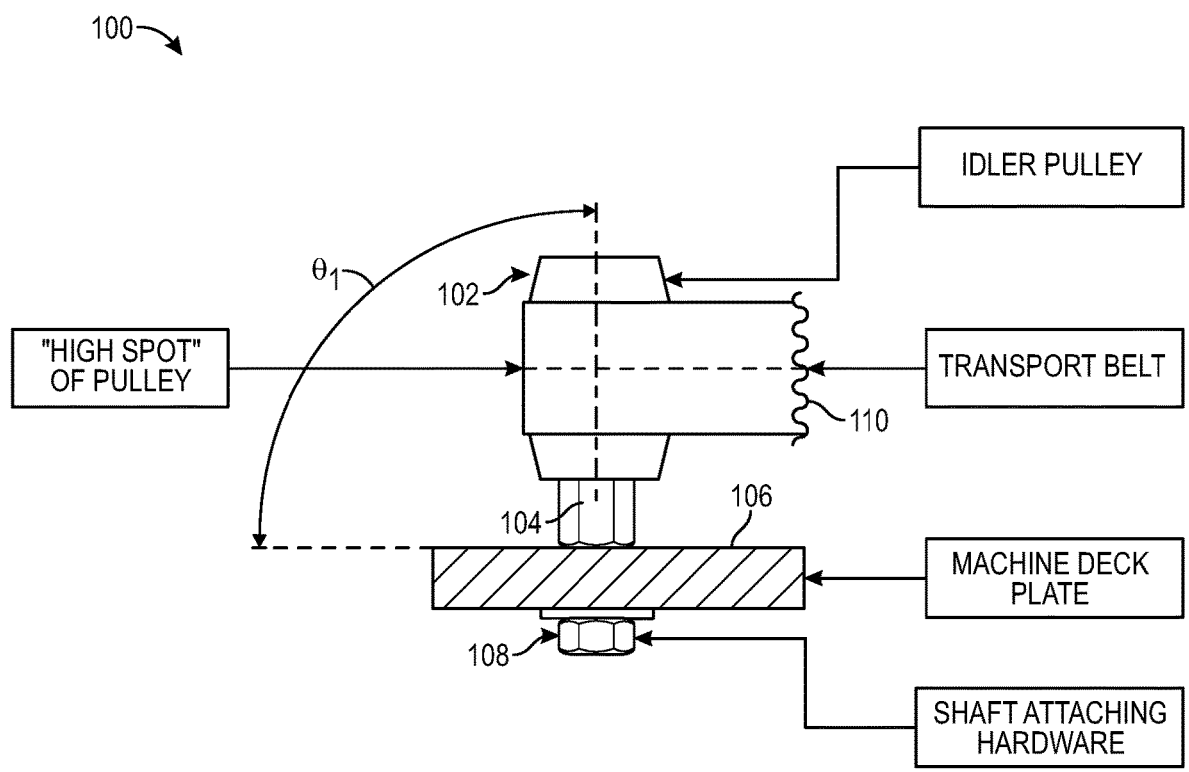
FIG. 1 illustrates a side view of a conventional pulley assembly, according to the prior art.
Figure 2:
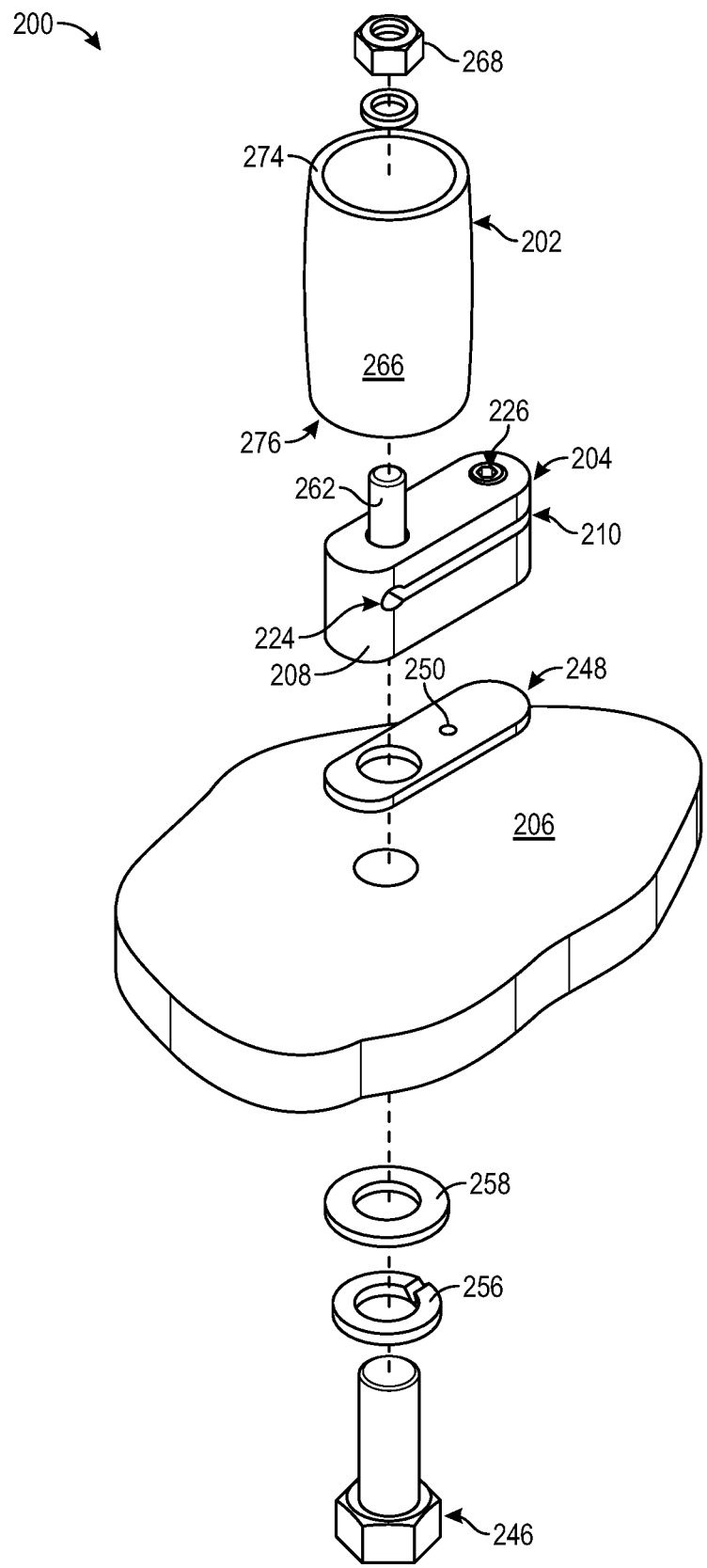
FIG. 2 illustrates an exploded view of an exemplary pulley assembly, according to one of more implementations disclosed.
Figure 3A:
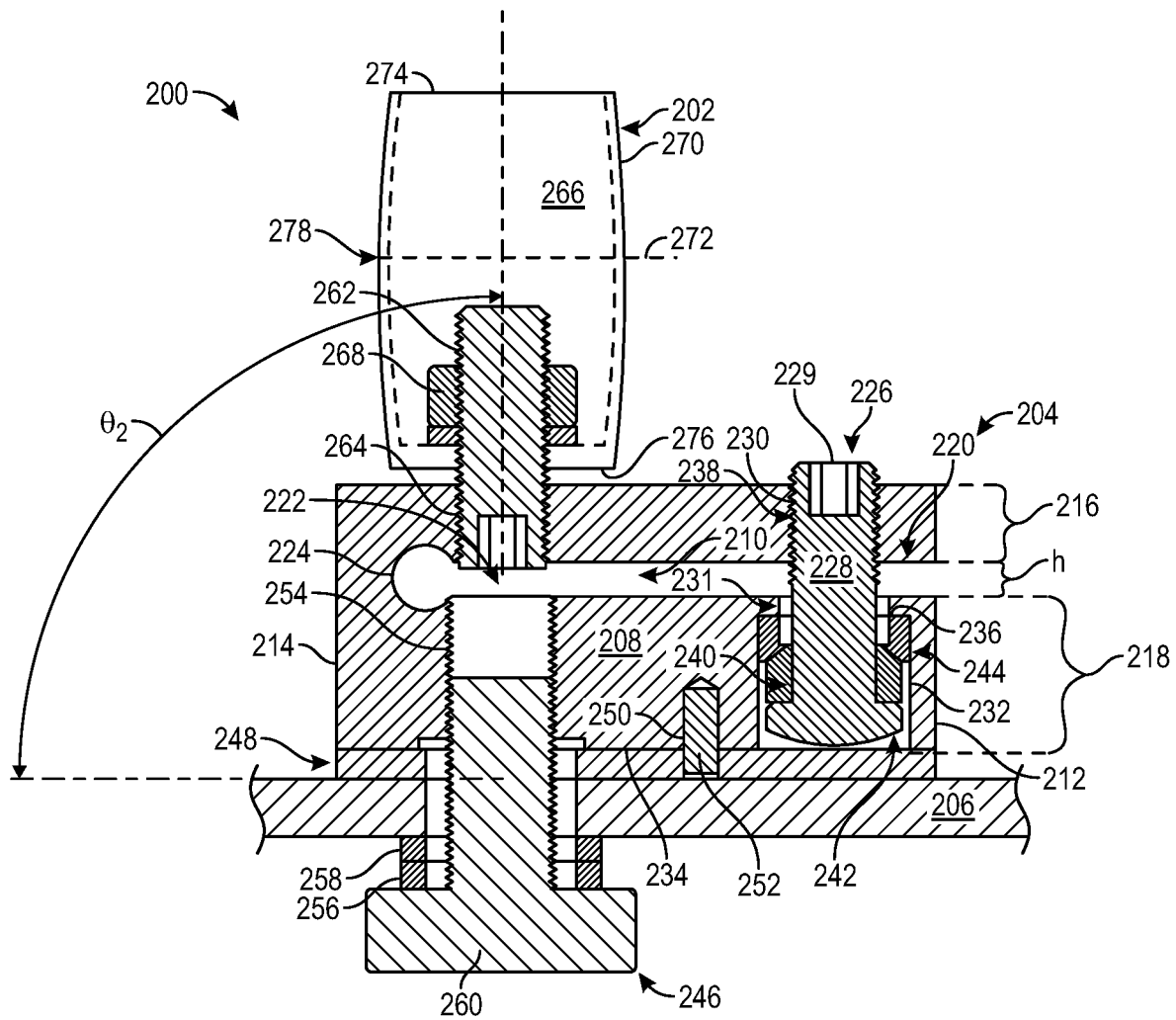
FIG. 3A illustrates a cross-sectional view of the exemplary pulley assembly of FIG. 2, according to one or more implementations disclosed.
Figure 3B:
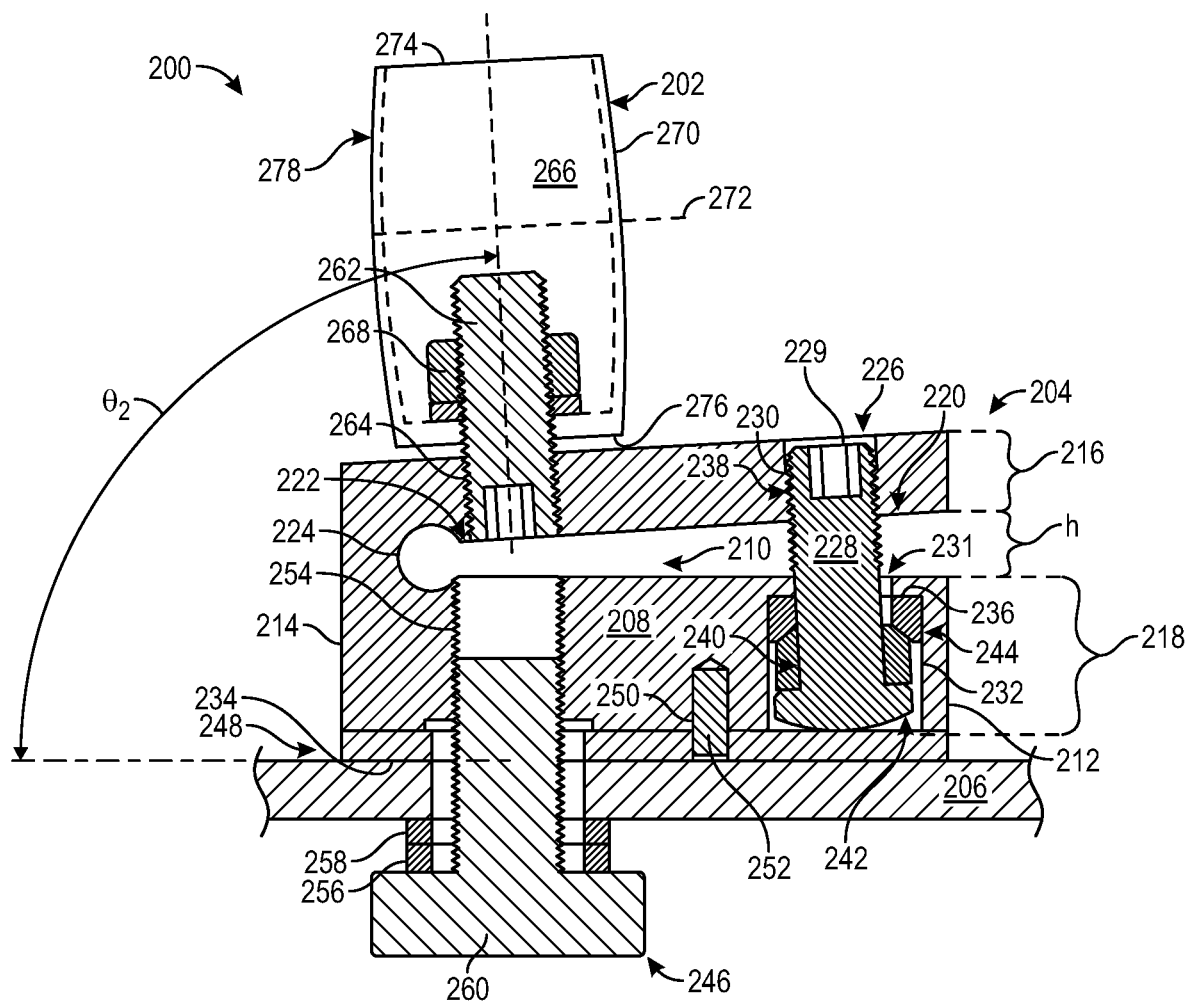
FIG. 3B illustrates a cross-sectional view of the exemplary pulley assembly of FIG. 2, according to one or more implementations disclosed.
Figure 3C:
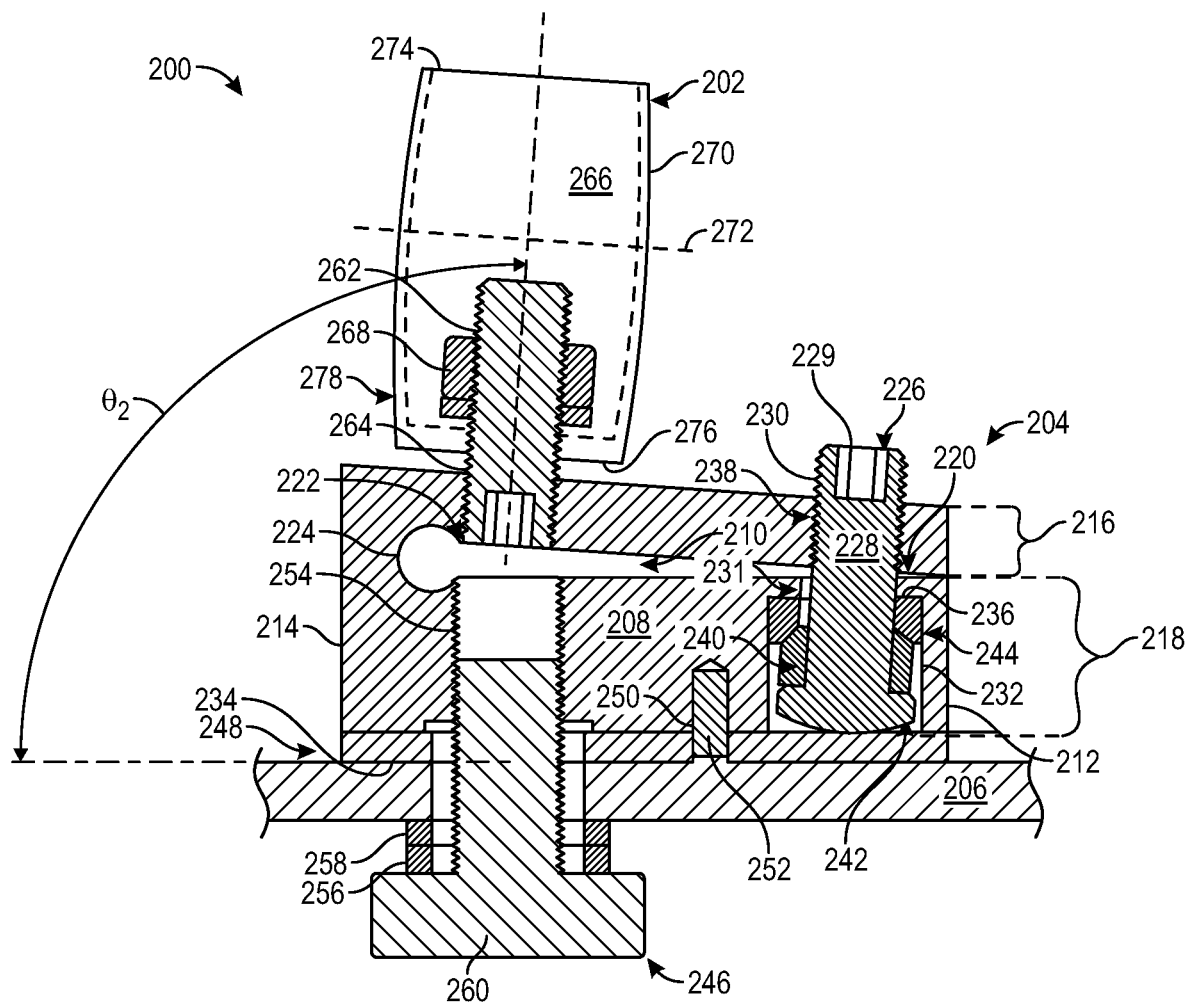
FIG. 3C illustrates a cross-sectional view of the exemplary pulley assembly of FIG. 2, according to one or more implementations disclosed.

FIG. 2 illustrates an exploded view of an exemplary pulley assembly 200 including a pulley 202 (102 in FIG. 1) and an adjuster assembly 204 operably coupled with one another, according to one of more implementations. FIGS. 3A, 3B, and 3C illustrate a cross-sectional view of the exemplary pulley assembly 200 illustrated in FIG. 2, according to one or more implementations. As illustrated in FIG. 3A, the adjuster assembly 204 may be coupled with a deck or platform 206 (106 in FIG. 1) of a machine, such as an automation or automative machine, for example, a conveyor belt machine, and the pulley 202 may be rotatably coupled with the adjuster assembly 204.

The adjuster assembly 204 may include a body 208 capable of or configured to at least partially adjust or control an angle ($\theta_2$) of the pulley 202 (and the mounting post or stud 262) relative to the deck 206 of the machine (e.g., a conveyor belt machine). As illustrated in the example shown in FIG. 3A, the body 208 may be a single, monolithic piece. The body 208 of the adjuster assembly 204 may be fabricated (e.g. milled or cast) from one or more metals (e.g., a single metal or a metal alloy). The one or more metals utilized to fabricate the body 208 may be at least partially determined by a stiffness or resistance to bending of the body 208 desired and resiliency. For example, the body 208 may be fabricated from high-carbon steel, or from carbon and stainless steel, which may provide high tensile strength, ductility, and stiffness.

As illustrated in FIG. 3A, the body 208 may define a slot or recess 210 extending from a first end surface 212 toward a second end surface 214 thereof. The recess 210 may at least partially separate or define an upper portion 216 of the body 208 from a lower portion 218 of the body 208. As further described herein, the upper portion 216 of the body 208 may be flexed, actuated, or otherwise moved away from or towards the lower portion 218 of the body 208, which may be fixedly coupled with the deck 206, to adjust the angle ($\theta_2$) of the pulley 202 relative to the deck 206.

In at least one implementation, a height (h) of the recess 210 in an unactuated or resting state may increase or decrease (e.g., taper inward or outward) from a first end portion 220 to a second end portion 222 thereof. In another implementation, the height (h) of the recess 210 in an unactuated or resting state (as illustrated in FIG. 3A) may be uniform or substantially uniform from the first end portion 220 to the second end portion 222 thereof. The height (h) of the recess 210 may limit or at least partially limit the movement of the upper portion 216 of the body 208 relative to the lower portion 218 of the body 208. For example, increasing the height (h) of the recess 210 may increase the distance over which the upper portion 216 may be flexed or actuated towards the lower portion 218 of the body 208. Similarly, decreasing the height (h) of the recess 210 may decrease the distance over which the upper portion 216 may be flexed or actuated towards the lower portion 218 of the body 208. As such, the height (h) of the recess 210 may at least partially determine the maximum amount in which the angle ($\theta_2$) of the pulley 202 relative to the deck 206 may be increased. Accordingly, the height (h) of the recess 210 may be controlled or adjusted to maintain the angle ($\theta_2$) within a component's recommended ranges. For example, the height (h) of the recess 210 may be controlled such that the angle ($\theta_2$) may not be increased by greater than or equal to about 2°, about 2.5°, about 3°, about 3.5°, about 4°, about 4.5°, about 5°, or any other upper limit determined by a manufacturer's recommended ranges for a belt or any other component (e.g., pulley, etc.). In an exemplary implementation, the recess 210 may have a height (h) of from about 0.06 inch to about 0.19 inch; for example, about 0.06 inches (in), about 0.08 in, about 0.10 in, about 0.12 in, about 0.13 in, about 0.15 in, about 0.17 in, about 0.19 in, or greater. For instance, the recess 210 may have a height (h) of about 0.125 in.

The body 208 may also define a hole or bore 224 connected to or extending through at least a portion of the recess 210. The bore 224 may be capable of or configured to relieve at least a portion of the stress or strain exerted on the body 208 when flexing or actuating the upper portion 216 towards or away from the lower portion 218. For example, as illustrated in FIG. 3A, the bore 224 may connect with or extend through the second end portion 222 of the recess 210, and be configured to relieve at least a portion of the stress or stress exerted on the portion of the body 208 that is proximal to the second end portion 222 of the recess 210 (e.g., configured in a smooth shape that does not include angles, such as right angles). It should be appreciated that relieving at least a portion of the stress or strain exerted on the portion of the body 208 that is proximal to the second end portion 222 of the recess 210 may extend the lifetime of the adjuster assembly 204 or the body 208 thereof. For example, reducing or relieving the stress or strain may delay the onset of fatigue exhibited by the body 208 from repeated actuation of the upper portion 216 towards and/or away from the lower portion 218 of the body 208.

The adjuster assembly 204 may include an actuation assembly 226 capable of or configured to control or adjust the flexing, bending, moving, or actuation of the upper portion 216 of the body 208 towards or away from the lower portion 218 of the body 208 to thereby adjust the angle ($\theta_2$) of the pulley 202 relative to the deck 206. For example, the actuation assembly 226 may be capable of or configured to apply a biasing force to the upper portion 216 of the body 208 to control the actuation of the upper portion 216 of the body 208 towards or away from the lower portion 218 of the body 208. As illustrated in FIGS. 3A-3C, the actuation assembly 226 may be disposed proximal, closer or nearer to the first end surface 212 of the body 208 than the second end surface 214. The actuation assembly 226 may include a mechanical biasing element 228 that is at least partially extending through the upper and lower portions 216, 218 of the body 208. For example, as illustrated in FIG. 3A, the body 208 may define a hole or bore 230 extending through the upper and lower portions 216, 218 of the body 208 and configured to receive the mechanical biasing element 228. At least a portion of the bore 230 may be threaded and configured to mate or threadably couple with the mechanical biasing element 228. For example, as illustrated in FIG. 3A, the portion of the bore 230 extending through the upper portion 216 of the body 208 may be threaded along its length. As further illustrated in FIG. 3A, the body 208 may also define a counterbore 232 that is coaxial with the bore 230 and that extends from a lower surface 234 of the body 208 to a shoulder 236 of the body 208. The counterbore 232 may be capable of or configured to receive at least a portion (e.g., the head 242) of the mechanical biasing element 228.

The mechanical biasing element 228 of the actuation assembly 226 may be or include, but is not limited to, one or more bolts (e.g., a threaded bolt, a shoulder bolt, a carriage bolt, or the like), nuts, and/or any other threaded elements or mechanical fasteners known in the art. In at least one implementation, illustrated in FIG. 3A, the mechanical biasing element 228 may be a shoulder bolt having a threaded portion 238, an unthreaded shoulder portion 240, and a head 242. As illustrated in FIG. 3A, the shoulder bolt 228 may be disposed in the bore 230 and the counterbore 232 such that the threaded portion 238 is threadably coupled with the upper portion 216 of the body 208, the unthreaded shoulder portion 240 extends through the lower portion 218 of the body 208, and the head 242 is disposed in the counterbore 232. As further illustrated in FIG. 3A, the shoulder bolt 228 may define a female hole or receptacle 229 configured to receive a corresponding bit (not shown) from a driver (not shown) to actuate or rotate the shoulder bolt 228. The female receptacle 229 may be sized and shaped for any suitable bit. Illustrative bits may be or include, but are not limited to, Phillips, flat head, hex, star, Allen, socket, or the like. In the implementation illustrated in FIG. 3A, the female receptacle 229 may be hex shaped and configured to receive and be driven by a hex wrench (not shown). In an alternate implementation (not illustrated), the head 242 of the shoulder bolt 228 may define the female receptacle.

In at least one implementation, the head 242 of the shoulder bolt 228 may be disposed directly adjacent to the shoulder 236 of the body 208 and configured to apply a biasing force thereto. In various implementations, one or more washers 244 may be interposed between the head 242 and the shoulder 236. Any washer or washers 244 that allow or facilitate the rotational and/or angular movement of the shoulder bolt 228 may be utilized. For example, as illustrated in FIG. 3A, two washers 244 may be used, such as a compressible, spherical two washer set or a compressible, self-aligning two washer set 244 that is capable of or configured to allow the shoulder bolt 228 to rotate and/or tilt to thereby align the shoulder bolt 228 with the bore 230 during actuation of the upper portion 216 towards or away from the lower portion 218 of the body 208. It should be appreciated that a diameter or size of a portion of the bore 230 extending through the lower portion 218 of the body 208 may be relatively greater than the shoulder 236 of the shoulder bolt 228 to allow free movement, rotation, and/or tilting of the shoulder bolt 228 during flexing or actuation of the upper portion 216 towards or away from the lower portion 218 of the body 208. In at least one implementation, the lower portion 218 of the body 208 may define a clearance hole 231 having a diameter relatively greater than the bore 230 and/or the unthreaded shoulder portion 240 of the shoulder bolt 228 to allow free movement, rotation, and/or tilting of the shoulder bolt 228 during flexing or actuation of the upper portion 216 towards or away from the lower portion 218 of the body 208. The size and/or dimension of the clearance hole 231 may be used to limit the height (h) of the recess 210. For example, the clearance hole 231 may be sized, and/or shaped such that the shoulder bolt 228 begins to bind on or interact with the clearance hole 231 at a prescribed angle of the upper portion 216 in relation to the lower portion 218.

In at least one implementation, a size, shape, and/or diameter of the clearance hole 231 may at least partially limit the amount of flexing, actuation, or movement of the upper portion 216 of the body 208 relative of the lower portion 218 of the body 208. For example, increasing the size of the clearance hole 231 may increase the maximum distance that the upper portion 216 may be actuated away from or towards the lower portion 218 of the body 208. Similarly, decreasing the size of the clearance hole 231 may decrease the maximum distance that the upper portion 216 may be actuated away from or towards the lower portion 218 of the body. As such, the size of the clearance hole 231 may affect, e.g., at least partially determine or limit, the amount that the angle ($\theta_2$) of the pulley 202 relative to the deck 206 may be decreased or increased. Similarly, the shape of the clearance hole 231 may affect the maximum distance that the upper portion 216 may be actuated or flexed away from or towards the lower portion 218 of the body 208. For example, the shape of the clearance hole 231 may be a slot or channel, circular, ovular, square, rectangular, or the like. Accordingly, the size, shape, and/or diameter of the clearance hole 231 may be designed, controlled, and/or adjusted to maintain the angle ($\theta_2$) within a desired range, e.g. such that the angle ($\theta_2$) cannot decrease beyond a desired maximum limit. For example, the size, shape, and/or diameter of the clearance hole 231 may be designed or controlled such that the angle ($\theta_2$) may not be decreased by greater than or equal to about 2° (e.g., the angle ($\theta_2$) cannot decrease to less than 88 degrees, relative to the deck 206), about 2.5°, about 3°, about 3.5°, about 4°, about 4.5°, about 5°, or any other desired lower limit, such as the limit recommended by the manufacturer of a component (e.g., a tracking belt, a pulley, etc.).

In at least one implementation, a length of the threaded portion 238 of the shoulder bolt 228 may at least partially limit the amount of flexing, actuation, or movement of the upper portion 216 of the body 208 relative of the lower portion 218 of the body 208. For example, increasing the length of the threaded portion 238 of the shoulder bolt 228 may increase the maximum distance that the upper portion 216 may be actuated away from the lower portion 218 of the body 208. Similarly, decreasing the length of the threaded portion 238 of the shoulder bolt 228 may decrease the maximum distance that the upper portion 216 may be actuated away from the lower portion 218 of the body. As such, the length of the threaded portion 238 of the shoulder bolt 228 may affect, e.g., at least partially determine or limit, the amount that the angle ($\theta_2$) of the pulley 202 relative to the deck 206 may be decreased. Accordingly, the length of the threaded portion 238 of the shoulder bolt 228 may be designed, controlled, or adjusted to maintain the angle ($\theta_2$) within a desired range, e.g. such that the angle ($\theta_2$) cannot decrease beyond a desired maximum limit. For example, the length of the threaded portion 238 of the shoulder bolt 228 may be designed or controlled such that the angle ($\theta_2$) may not be decreased by greater than or equal to about 2° (e.g., the angle ($\theta_2$) cannot decrease to less than 88 degrees, relative to the deck 206), about 2.5°, about 3°, about 3.5°, about 4°, about 4.5°, about 5°, or any other desired lower limit, such as the limit recommended by the manufacturer of a component (e.g., a tracking belt, a pulley, etc.).

While FIG. 3A illustrates the actuation assembly 226 oriented such that the head 242 of the shoulder bolt 228 is disposed adjacent to or in the lower portion 218 of the body 208, it should be appreciated that the actuation assembly 226 may be arranged such that the head 242 of the shoulder bolt 228 is disposed adjacent to or in the upper portion 216 of the body 208. For example, the body 208 may define the counterbore 232 in the upper portion 216 thereof, and the portion of the bore 230 extending through the lower portion 218 of the body 208 may be threaded along a length thereof. Accordingly, the head 242 of the shoulder bolt 228 may be disposed in the counterbore 232 defined in the upper portion 216 (with or without the washer set 244), and the threaded portion 238 may be threadably coupled with the lower portion 218 of the body.

In various implementations, as illustrated in FIGS. 2 and 3A, the body 208 of the adjuster assembly 204 may be coupled to or with the deck 206 of a machine. For example the body 208 of the adjuster assembly 204 may be coupled with the deck 206 of the machine using or via one or more mechanical fasteners (e.g. a mechanical fastener 246). In the implementation shown, the body 208 of the adjuster assembly 204 is coupled with the deck 206 using or via a spacer 248 interposed between the body 208 of the adjuster assembly 204 and the deck 206. The spacer 248 may be capable of or configured to or designed to adjust or control or define the position of the adjuster assembly 204 and/or the body 208 thereof relative to the deck 206. For example, the thickness or width of the spacer 248 may be designed, varied or controlled to position or offset the adjuster assembly 204 a desired specific distance from or relative to the deck 206. In some examples, the spacer 248 may be capable of or configured to or designed to at least partially index or rotationally position the adjuster assembly 204 relative to the mechanical fastener 246 and/or the deck 206. For example, as illustrated in FIG. 3A, the spacer 248 may define a hole 250 extending at least partially therethrough. The hole 250 may be configured to receive a pin 252 (e.g., a roll pin, a spring pin, etc.) integrally formed, coupled with, operably coupled with, or otherwise extending from the body 208 of the adjuster assembly 204 to rotationally position or index the adjuster assembly 204. The pin 252 may also be capable of or configured to maintain the position of the spacer 248 relative to the adjustor assembly 204 or a component thereof. The spacer 248 may be capable of or configured to protect the surfaces of the adjuster assembly 204 and/or the deck 206. For example, the spacer 248 may be formed of a metal or a non-metal material (e.g. plastic, leather, hard rubber, or the like) and/or disposed between the body 208 of the adjuster assembly 204 and the deck 206 to protect the interfacing surfaces thereof. In at least one implementation, the spacer 248 may be fabricated from a mild steel, such as a coated mild steel (e.g., zinc coated mild steel). Friction and/or the mechanical fastener 246 may prevent or hinder rotation or movement of the spacer 248 relative to the deck 206. For example, a clamping force from the mechanical fastener 246 and/or the friction from interfacing surfaces of the spacer 248 and the deck 206 may prevent or hinder movement or rotation between the spacer 248 and the deck 206.

Although the example of FIG. 3A includes a spacer 248, in at least one other implementation (not shown), the body 208 of the adjuster assembly 204 may be directly coupled with the deck 206 of the machine. For example the body 208 of the adjuster assembly 204 may be directly coupled with the deck 206 of the machine using or via one or more mechanical fasteners (e.g. mechanical fastener 246) and without any spacer 248.

Illustrative mechanical fasteners 246 for coupling the adjuster assembly 204 with the deck 206 may be or include, but are not limited to, one or more bolts (e.g., threaded bolt, shoulder bolt, etc.), nuts, and/or any other mechanical fasteners known in the art. For example, as illustrated in FIG. 3A, the mechanical fastener 246 may be or include a threaded bolt 246 configured to secure or engage a threaded hole 254 defined in the body 208 of the adjuster assembly 204 to couple the body 208 with the deck 206. While the threaded hole 254 illustrated in FIG. 3A extends from the lower surface 234 of the body 208 to the recess 210, it should be appreciated that the threaded hole 254 may be a blind threaded hole that extends from the lower surface 234 of the body 208 towards the recess 210 without extending into the recess 210.

As illustrated in FIG. 3A, one or more washers (two are shown 256, 258) may be disposed between a head 260 of the mechanical fastener 246 and the deck 206. Illustrative washers 256, 258 may be or include, but are not limited to, flat washers, split or lock washers, internal or external tooth lock washers, or the like, or any combination thereof. For example, as illustrated in FIG. 2, a lock washer 256 and a flat washer 258 may be disposed between the head 260 of the mechanical fastener 246 and the deck 206.

The pulley assembly 200 or the adjuster assembly 204 thereof may include a mounting post or stud 262 configured to receive and operably attach or couple the pulley 202 with the upper portion 216 of the body 208. In at least one implementation (not shown), the mounting stud 262 may be integrally formed with the body 208. In another implementation, the mounting stud 262 may be a separate part that is coupled with the body 208 via any suitable means. For example, as illustrated in FIG. 3A, the body 208 may define a hole (e.g., a threaded hole) 264 extending through the upper portion 216 thereof and configured to receive the mounting stud 262, and the mounting stud 262 may be disposed in the hole 264 and coupled with the body 208 via, for example, an interference or friction fit.

In another example, as illustrated in FIG. 3A, the hole 264 may be a threaded hole configured to mate with the corresponding threads of the mounting stud 262. As further illustrated in FIG. 3A, the hole 264 and/or the mounting stud 262 extending therethrough may be coaxial with the threaded hole 254 defined in the lower portion 218 of the body 208. It should be appreciated that maintaining the mounting stud 262 and the threaded hole 254 coaxial with one another may have the advantage of allowing the pulley assembly 200 disclosed herein to be retrofit into existing machines having a conveyor belt without changing or adjusting the original belt path.

The pulley 202 may include or be a generally annular, barrel-shaped, or cylindrical body 266 that is coupled with the body 208 of the adjuster assembly 204 via the mounting stud 262. The cylindrical body 266 of the pulley 202 may be coupled with the mounting stud 262 via any suitable means. For example, as illustrated in FIG. 3A, the cylindrical body 266 may be coupled with the mounting stud 262 via a nut 268 configured to mate with the threads of the mounting stud 262. In at least one implementation, the cylindrical body 266 of the pulley 202 may be coupled with the mounting stud 262 via one or more bearings (e.g., rolling element bearings) (not shown) to facilitate the rotation of the pulley 202 about the mounting stud 262.

The outer surface 270 of the cylindrical body 266 may taper radially inward from the centerline 272 towards the axial ends 274, 276 thereof. As such, a radial length of the cylindrical body 266 at the centerline 272 may be relatively greater than a radial length at each of the axial ends 274, 276 thereof. In at least one implementation (not shown), the pulley 202 may define a flange (not shown) disposed at one or both of the axial ends 274, 276 thereof. The flange may be configured to facilitate or maintain contact between the pulley 202 and a belt (not shown in FIG. 3A) rotating thereon. For example, the flange may keep the belt from drifting, rotating, or shifting off of (e.g., past the axial end 274) the pulley 202. In the implementation illustrated in FIG. 3A, in contrast, the pulley 202 does not include a flange at either of the axial ends 274, 276 thereof. In both implementations, it is advantageous to adjust or influence the position of the belt relative to the centerline 272 of the pulley 202 by adjusting or varying the angle ($\theta_2$) of the pulley 202 relative to the deck 206.

In an exemplary operation of the pulley assembly 200, with continued reference to FIGS. 3A, 3B, and 3C, the actuation assembly 226 may be operated to actuate the adjuster assembly 204 from a neutral, unactuated, or unflexed state (as illustrated in FIG. 3A) to an actuated or flexed state (as illustrated in FIGS. 3B and 3C). For example, referring now to FIG. 3B, the shoulder bolt 228 of the actuation assembly 226 may be rotated (e.g., turned clockwise with a hex wrench mated with the female receptacle 229) such that the threads of the shoulder bolt 228 interact with the threads of the bore hole 230 to apply a biasing force that pushes or actuates the upper portion 216 of the body 208 of the adjuster assembly 204 away from the lower portion 218 of the body 205, to thereby decrease the angle ($\theta_2$) of the pulley 202 relative to the deck 206. Similarly, referring now to FIG. 3C, the shoulder bolt 228 of the actuation assembly 226 may be rotated (e.g., turned counterclockwise with a hex wrench) such that the threads of the shoulder bolt 228 interact with the threads of the bore hole 230 to apply a biasing force that pushes or actuates the upper portion 216 of the body 208 of the adjuster assembly 204 towards the lower portion 216 of the body 208, to thereby increase the angle ($\theta_2$) of the pulley 202 relative to the deck 206.

As the pulley assembly 200 is actuated from a neutral, unactuated, or unflexed state (as illustrated in FIG. 3A) to an actuated or flexed state (as illustrated in FIGS. 3B and 3C), the upper portion 216 of the body 208 may flex or hinge elastically around the bore 224, the shoulder bolt 228 may tilt or move within the clearance hole 231, the spherical washer set 244 may facilitate the tilting or movement of the shoulder bolt 228 within the counterbore 232, or any combination thereof. As illustrated in FIG. 3C, the flexing or actuation of the upper portion 216 towards the lower portion 218 is limited by the contact between the upper and lower portions 216, 218 at the first end surface 212. As further illustrated in FIG. 3B, the flexing or actuation of the upper portion 216 away from the lower portion 218 may be limited by the contact between the clearance hole 231 and the shoulder bolt 228 or the unthreaded shoulder portion 240 thereof.

It should be appreciated that decreasing or increasing the angle ($\theta_2$) of the pulley 202 relative to the deck 206 may shift a "relative high spot" 278 of the pulley 202 towards a first axial end 274 or a second axial end 276 thereof, respectively. As used herein, "relative high spot" may refer to a point or position on the pulley 202 in which a belt (not shown) may be urged or shifted towards. For example, as illustrated in FIG. 3A and described above, the pulley 202 may include the cylindrical body 266 that tapers radially inward from the centerline 272 towards the axial ends 274, 276 thereof. As such, in an unactuated state, the relative high spot 278 of the pulley 202 may be coincident or generally coincident with the centerline 272 of the cylindrical body 266. Further, as illustrated in FIG. 3B, in an actuated state when the angle ($\theta_2$) is decreased, the relative high spot 278 may shift toward the first axial end 274 of the cylindrical body 266. Conversely, as illustrated in FIG. 3C, in an actuated state when the angle ($\theta_2$) is increased, the relative high spot 278 may shift towards the second axial end 276 of the cylindrical body 266. It should be appreciated that a belt (not shown) disposed about the pulley 202 will travel towards the "high spot" 278 of the pulley 202. Accordingly, the actuation assembly 226 may be operated to adjust the angle ($\theta_2$) of the pulley 202 relative to the deck 206 and thereby control a position of the belt rotating on or about the pulley 202. It should further be appreciated that the belt may contact or be wrapped around the cylindrical body 266 on any surface or side thereof.

As illustrated in FIGS. 3A, 3B, and 3C, adjusting the angle ($\theta_2$) of the pulley 202 relative to the deck 206 does not require any direct interaction or interference with the pulley 202 or the mounting stud 262. As such, it should be appreciated that the angle ($\theta_2$) of the pulley 202 relative to the deck 206 may be safely adjusted dynamically, e.g., while the pulley 202 and/or the belt and/or the machine is operating, thereby reducing the amount of time it takes and simplifying the process of adjusting the position of the belt. For example, an operator may make adjustments using a long-shanked hex wrench that is passed through the moving belt loop and into the socket in the shoulder bolt 228, where the shank of the hex wrench is sufficiently long to keep the operator a safe distance from the moving pulley 202 and belt. As further illustrated in FIGS. 3A, 3B, and 3C, no hinges, pivot pins, or springs are necessary to actuate the upper portion 216 of the body 208 towards or away from the lower portion 218 of the body 208.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A pulley assembly for positioning a belt of a machine, the pulley assembly comprising:
    a monolithic body comprising a first end surface and a second end surface, the monolithic body defining a recess extending from the first end surface toward the second end surface, the recess at least partially separating an upper portion of the monolithic body from a lower portion of the monolithic body, the monolithic body further defining a bore extending through the upper and lower portions of the monolithic body, a portion of the bore being threaded along a length thereof;
    an actuation assembly operably coupled with the monolithic body, the actuation assembly comprising a mechanical biasing element comprising a threaded portion, the mechanical biasing element being disposed in the bore such that the threaded portion of the mechanical biasing element is threadably coupled with the threaded portion of the bore; and
    a pulley rotatably coupled with the upper portion of the monolithic body such that the pulley moves when the upper portion of the monolithic body is actuated.

2. The pulley assembly of claim 1, wherein the actuation assembly is disposed proximal to the first end surface of the monolithic body.

3. The pulley assembly of claim 1, wherein the mechanical biasing element is configured to apply a biasing force to the upper and lower portions of the monolithic body to actuate the upper and lower portions of the monolithic body toward or away from one another.

4. The pulley assembly of claim 1, wherein the monolithic body defines a counterbore coaxial with the bore and extending through the lower portion of the monolithic body from a lower surface of the monolithic body to a shoulder in the lower portion of the monolithic body.

5. The pulley assembly of claim 4, wherein the mechanical biasing element further comprises a head, and wherein the mechanical biasing element is disposed in the bore and the counterbore such that the threaded portion thereof is threadably coupled with the upper portion of the monolithic body and the head is disposed in the counterbore.

6. The pulley assembly of claim 5, wherein the head of the mechanical biasing element is disposed directly adjacent to the shoulder in the lower portion of the monolithic body.

7. The pulley assembly of claim 5, wherein the actuation assembly further comprises one or more washers interposed between the head of the mechanical biasing element and the shoulder defined in the lower portion of the monolithic body.

8. The pulley assembly of claim 7, wherein the one or more washers comprise a spherical washer set.

9. The pully assembly of claim 1, wherein the monolithic body defines a counterbore coaxial with the bore, the counterbore extending through the upper portion of the monolithic body from an upper surface thereof to a shoulder in the upper portion of the monolithic body.

10. The pully assembly of claim 9, wherein the mechanical biasing element further comprises a head, and wherein the mechanical biasing element is disposed in the bore and the counterbore such that the threaded portion is threadably coupled with the lower portion of the monolithic body and the head is disposed in the counterbore.

11. The pully assembly of claim 10, wherein the head of the mechanical biasing element is disposed directly adjacent to the shoulder in the upper portion of the monolithic body.

12. The pully assembly of claim 10, wherein the actuation assembly further comprises one or more washers interposed between the head of the mechanical biasing element and the shoulder defined in the upper portion of the monolithic body.

13. The pulley assembly of claim 1, wherein the monolithic body is directly coupled with a deck of the machine.

14. The pulley assembly of claim 1, further comprising a spacer interposed between the monolithic body and a deck of the machine, the spacer configured to position the monolithic body a specific distance from the deck, wherein the spacer defines a hole extending at least partially therethrough, wherein the pulley assembly further comprises a pin extending from a lower surface of the monolithic body, and wherein the pin is disposed in the hole of the spacer.

15. A pulley assembly for a machine comprising a deck, the pulley assembly comprising:
    a monolithic body coupled with the deck and including a first end surface and a second end surface, the monolithic body defining a recess extending from the first end surface toward the second end surface, the recess at least partially separating an upper portion of the monolithic body from a lower portion of the monolithic body, the monolithic body further defining a bore extending through the upper and lower portions of the monolithic body, a portion of the bore being threaded along a length thereof;
    a mounting stud extending from and coupled with the upper portion of the monolithic body;
    a pulley rotatably coupled with the mounting stud; and
    an actuation assembly operably coupled with the monolithic body, the actuation assembly comprising a mechanical biasing element comprising a threaded portion and a head, the mechanical biasing element being disposed in the bore such that the threaded portion is threadably coupled with the threaded portion of the bore and the head is disposed adjacent a shoulder defined in the upper or lower portions of the monolithic body.

16. The pully assembly of claim 15, wherein the mechanical biasing element is configured to apply a biasing force to the upper and lower portions of the monolithic body to actuate the upper and lower portions of the monolithic body toward or away from one another to thereby increase or decrease an angle of the pulley relative to the deck, respectively.

17. The pulley assembly of claim 15, wherein:
    the shoulder is defined in the lower portion of the monolithic body,
    the monolithic body further defines a counterbore coaxial with the bore and extending from a lower surface of the monolithic body to the shoulder in the lower portion of the monolithic body, and
    the mechanical fastener is disposed in the bore and the counterbore such that the threaded portion thereof is threadably coupled with the upper portion of the monolithic body and the head is disposed in the counterbore.

18. A method for adjusting a pulley assembly of a machine that includes a conveyor belt, the pulley assembly comprising:
    a monolithic body comprising a first end surface and a second end surface, the monolithic body defining a recess extending from the first end surface toward the second end surface, the recess at least partially separating an upper portion of the monolithic body from a lower portion of the monolithic body, the monolithic body further defining a bore extending through the upper and lower portions of the monolithic body, a portion of the bore being threaded along a length thereof;

an actuation assembly operably coupled with the monolithic body, the actuation assembly comprising a mechanical biasing element comprising a threaded portion, the mechanical biasing element being disposed in the bore such that the threaded portion of the mechanical biasing element is threadably coupled with the threaded portion of the bore; and a pulley rotatably coupled with the upper portion of the monolithic body such that the pulley moves when the upper portion of the monolithic body is actuated;

the method comprising:

rotating the mechanical biasing element of the actuation assembly to apply a biasing force to the upper and lower portions of the monolithic body, wherein the biasing force moves the upper and lower portions of the monolithic body toward or away from one another to thereby increase or decrease an angle of the pulley relative to the machine; and ceasing the rotating when the pulley reaches a desired angle relative to the machine.

19. The method of claim 18, wherein the mechanical biasing element is a mechanical fastener that extends at least partially through the upper portion and the lower portion of the monolithic body, and wherein rotating the mechanical biasing element comprises rotating the mechanical fastener such that the threads apply the biasing force.

20. The method of claim 19, wherein:

the portion of the bore extending through the upper portion is threaded, the monolithic body further defines a counterbore coaxial with the bore and extending from a lower surface of the monolithic body to a shoulder in the lower portion of the monolithic body, and the mechanical fastener is disposed in the bore and the counterbore such that the threaded portion thereof is threadably coupled with the upper portion of the monolithic body and the head is disposed in the counterbore.

* * * * *